United States Patent [19]

White

[11] 4,221,881

[45] Sep. 9, 1980

[54] BLOCK POLYMERS OF POLYPHENYLENE OXIDE AND POLYSTYRENE

[75] Inventor: Dwain M. White, Schenectady, N.Y.

[73] Assignee: General Electric Company, Schenectady, N.Y.

[21] Appl. No.: 916,762

[22] Filed: Jun. 19, 1978

[51] Int. Cl.² ............................................. C08K 53/00
[52] U.S. Cl. ....................................... 525/109; 525/92
[58] Field of Search .................... 260/823, 874, 876 B; 525/92, 109

[56] References Cited

U.S. PATENT DOCUMENTS

| | | | |
|---|---|---|---|
| 3,573,254 | 3/1971 | Factor | 260/47 |
| 3,700,630 | 10/1972 | Hamada et al. | 260/874 |
| 3,703,564 | 11/1972 | White | 260/823 |
| 3,970,640 | 7/1976 | Yonemitsu et al. | 260/47 ET |

Primary Examiner—Hosea E. Taylor
Assistant Examiner—Amelia B. Yarbrough
Attorney, Agent, or Firm—F. Wesley Turner; James C. Davis, Jr.; Leo I. MaLossi

[57] ABSTRACT

Linear, branched and/or cross-linked block polymers of polyphenylene oxides and polystyrene are described. The polyphenylene oxide-polystyrene block polymers can be molded, calendered, or extruded as films, sheets, fibers, laminates or other useful articles of manufacture.

14 Claims, No Drawings

BLOCK POLYMERS OF POLYPHENYLENE OXIDE AND POLYSTYRENE

CROSS REFERENCE TO RELATED APPLICATIONS

This invention is related to subject matter disclosed in copending U.S. Ser. Nos. 800,635, 800,648, and 800,656 all filed May 26, 1977; 907,596 filed May 19, 1978; Ser. Nos. 916,761 and 916,763 both filed June 19, 1978; U.S. Pat. No. 4,140,675 issued Feb. 20, 1979 and U.S. Pat. No. 4,146,697 issued Mar. 27, 1979. All of the aforesaid applications are assigned to the assignee of this application and all of the subject matter disclosed and referenced therein is incorporated herein in its entirety by reference.

BACKGROUND OF THE INVENTION

1. Field of the Invention

This invention relates to linear, branched, and/or cross-linked block polymers of polyphenylene oxides and polystyrenes. The polyphenylene oxide-polystyrene block polymers can be molded, calendered, or extruded as films, sheets, fibers, laminates or other useful articles of manufacture.

In my copending U.S. applications Ser. No. 800,635 new quinone-coupled to polyphenylene oxide polymers having an average hydroxyl group per molecule value greater than zero including 2.0 or less, and Ser. No. 907,596 and U.S. Pat. No. 4,146,697 new polyfunctional styrene polymers having telechelic organosiloxy and/or hydroxy functional groups, respectively, are described. The new polyfunctional quinone-coupled polyphenylene oxides either alone or in combination with monofunctional polyphenylene oxides of the prior art, i.e., polyphenylene oxides having an average hydroxyl group per molecule value greater than zero including 1.0 or less, or combinations thereof can be coupled with the new polyfunctional polystyrenes to form new linear, branched, and/or cross-linked polyphenylene oxide-polystyrene block polymers.

2. Description of the Prior Art

Self-condensation reactions of certain phenols employing oxygen in combination with an effective oxidative coupling catalyst system to form monofunctional prior art polyphenylene oxides, i.e., polyphenylene oxides having an average hydroxyl group per molecule of 1.0 or less, are well-known and are described in various publications including Hay's U.S. Pat. Nos. 3,306,879; 3,914,266; 4,028,341, a continuation-in-part of Ser. No. 441,295, filed Feb. 11, 1974, now abandoned; Olander's U.S. Pat. Nos. 3,956,442; 3,965,069; 3,972,851 and 4,054,553, among many others.

DESCRIPTION OF THE INVENTION

This invention embodies linear, branched, and/or cross-linked block polymers of polyphenylene oxides and polystyrenes. The polyphenylene oxide-polystyrene block polymers can be molded, calendered, or extruded as films, sheets, fibers, laminates or other useful articles of manufacture.

In general, illustrative of the broad group of linear, branched and cross-linked polyphenylene oxide-polystyrene block polymers that are included within the scope of this invention are those described, among others, by the following model structures:

| | |
|---|---|
| (I linear) | AZC, BZC, AZCZA, AZCZB, BZCZB, AZCZBZCZA, AZCZBZCZCZB, etc., etc., etc. |
| (I branched) | B   C C   B C   A   C<br>AZC, AZBZA, AZBZA, AZCZBZBZA, etc., etc., etc. |
| (I cross-linked) |         A<br>   C       Z<br>AZBZCZA, CZBZCZ , etc., etc., etc.<br>   C   B   C<br>AZBZCZBZC AZBZCZA<br>        A |

The above illustrative linear, branched, and cross-linked combinations of polyfunctional polyphenylene oxide and polyfunctional polystyrene units, including monofunctional polyphenylene oxides and combinations thereof, including random and/or alternating arrangements of polymer units defined by the units A, B, C, or coupling agent Z—which units and coupling agents are described in greater detail hereafter—are not intended to limit the combinations that can be obtained by the practice of this invention since the block polymer combinations of this invention are limited only by the amount of block polymer precursors charged to the reaction medium in carrying out the process of this invention. Presently preferred block polymers of polyphenylene oxide and polystyrene are linear block polymers wherein the coupling agent of the polymer backbone is a bifunctional coupling agent. Even more preferred are linear polymers containing substantial amounts of polystyrene units, i.e. amounts sufficient to provide polystyrene segments which comprise from about 20 to about 80 percent by weight of the total weight of block polymer.

In general, the expression "monofunctional polyphenylene oxides" as employed herein and in the claims includes polyphenylene oxides having an average hydroxyl group per molecule value greater than zero including 1.0 or less. These polyphenylene oxides can be prepared by any of the methods of the prior art, and can be described by formula (II) set out hereafter:

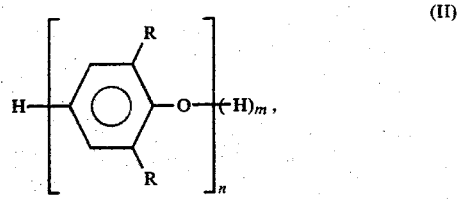

(II)

wherein independently each R is hydrogen, a hydrocarbon radical, a halohydrocarbon radical, a hydrocarbonoxy radical or a halohydrocarbonoxy radical, n is a number of at least 1, preferably 10, and more preferably 40 to 170, and m being a number average of from 0.001 to about 1.0. The monofunctional polyphenylene oxide units of the block polymers can be conceptualized by the structure of formula (I) above wherein the hydrogen atom is disassociated from the monohydroxy group of the polyphenylene oxide, e.g. where m is zero. When m is zero, the radical of formula (II) can be described as a phenoxy radical, a monovalent phenoxy residue and can be abbreviated by the formula —A.

In general, the expression "polyfunctional polyphenylene oxides" as employed herein and in the claims includes quinone-coupled polyphenylene oxides having an average hydroxyl group per molecule greater than zero including 2.0 or less. These polyphenylene oxides can be prepared by the methods described in U.S. application Ser. Nos. 800,635 and 800,646, and can be described by the formula (III) set out hereafter:

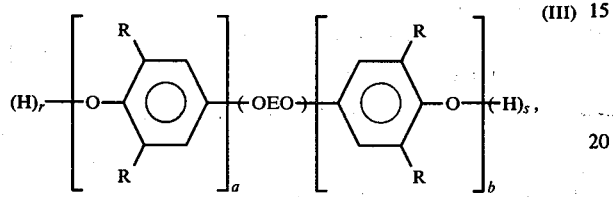

(III)

wherein independently each $-(OEO)-$ is a divalent quinone residue, E is a divalent arene radical, either a or b is at least equal to 1, the sum of a plus b is preferably at least equal to 10, more preferably 40 to 170, the sum of r and s being a number average of from about 0.001 to about 2.0, R is the same as in formula (I) above. The polyfunctional polyphenylene oxide units of the block polymers can be conceptualized by the structure of formula (III) above wherein the hydrogen atoms are disassociated from the polyhydroxy groups of the quinone-coupled polyphenylene oxide, e.g. where r and s are equal to zero. When r and s are zero the radical of formula (III) can be described as quinone-coupled polyphenoxy radical, a divalent phenoxy radical, and can be abbreviated by the formula —B—.

In general, the expression "polyfunctional polystyrene" as employed herein and in the claims includes polystyrenes having an average hydroxyl or siloxy group per molecule value greater than zero including 2 or more. The polystyrenes can be prepared by the methods disclosed in my copending applications Ser. No. 907,596 and U.S. Pat. No. 4,146,697 and can be described by formula (IV) set out hereafter:

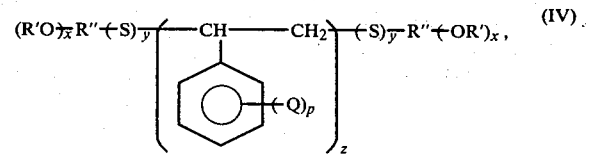

(IV)

wherein independently each x is an integer at least equal to 1 and is a maximum equal to the number of replaceable hydrogen atoms associated with the R" arene radical, y is an integer at least equal to 1, R' is hydrogen or an organosilyl group, i.e. $(R'''_3-Si)-$, R''' being an alkyl, cycloalkyl, or aryl radical including combinations thereof, R" is at least a divalent arene radical having at least one (R'O)— radical directly bonded to an aromatic ring carbon atom via an oxygen atom, Q is a hydrogen, halogen, alkyl or alkenyl radical, p is an integer of from 1 to 5, and z is an integer at least equal to 2, preferably 10 to 500, and more preferably 50 to 300. The polyfunctional polystyrene units of the block polymers can be conceptualized by the structure of formula (IV) above wherein the hydrogen or silyl group is disassociated from the oxygen atom. When the R' group is disassociated, the radicals of formula (IV) can be described as polystyrene having polyfunctional phenoxy radical end groups and can be abbreviated by the formula —C—. Although in formula (IV) above the recurring styrenic monomeric units are illustratively described as follows:

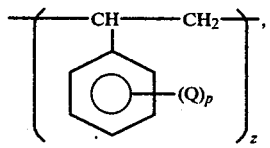

wherein Q, p and z are as defined hereinbefore, the term "polystyrene" as used herein and in the claims includes any of the well-known homo- or copolystyrene types, e.g. styrene-acylonitrile; styrene-butadiene-acrylonitrile; styrene-butadiene; styrene-divinyl benzene; styrene-maleic anhydride; styrene-methyl methacrylate; styrene-vinyl acetate; styrene-isoprene, etc.

In general, the expression coupling agents as employed herein and in the claims includes "polyacyl halides", e.g. acyl halides having at least two halide coupling reaction sites. These acyl halides can be described by the formula (V) set out hereafter:

(V)

wherein c is a number at least equal to 2, X is a halogen, e.g. fluorine, chlorine, bromine or iodine, preferably chlorine, and R"" is $C_{1-8}$ alkylene, $C_{1-8}$ alkenylene, phenylene, halophenylene and $C_{1-8}$ alkyl substituted phenylene. The coupling agents of the block polymers can be conceptualized by the structure of formula (V) above wherein the halogen atoms are disassociated from the acyl halides. These radicals are abbreviated herein by the symbol —Z—, or

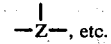

—Z—, etc.

Illustrative of a portion of presently preferred acyl halides are the acid halides of the following acids: malonic, succinic, maleic, fumaric, itaconic, mesaconic, citraconic, glutaric, adipic, pimelic, suberic, azelaic, trimellitic, phthalic, isophthalic, terephthalic and the above phthalic acids having from one to four halogens, preferably chloro substituents or from one to four $C_{1-8}$ alkyl substituents. The most preferred phthalic acid halides are unsubstituted and have two chlorine substituents, e.g. isophthaloyl chloride.

In general, the process of preparing polyphenylene oxide-polystyrene block polymers comprises contacting mono and/or polyfunctional polyphenylene oxides, polyfunctional polystyrenes and coupling agents in the presence of an aqueous solution of a water soluble base and a catalytic phase transfer agent. Any amount of functional (reactive) polyphenylene oxides, polystyrenes and coupling agent can be employed, e.g. from 1/1000 to 1000 times the stoichiometric requirements required to completely couple all of the reactive polyphenylene oxide and polystyrene.

Any water soluble base can be employed, however preferably is an aqueous solution of a water soluble base, e.g. an aqueous alkaline metal or alkaline earth metal hydroxide or carbonate solution. Specific examples include aqueous solutions of potassium hydroxide, sodium hydroxide, sodium monocarbonate, barium carbonate, etc. Any amount of water soluble base (WSB) can be employed. Generally effective mole proportions of WSB relative to the amount of coupling agent that are employed are coupling agent:water soluble base proportions of from about 1:100 to about 50:1 and more frequently from about 1:10 to about 10:1.

Any catalytic phase transfer agent can be employed, however, preferably is a phase transfer agent selected from the group consisting of quaternary ammonium, quaternary phosphonium, and tertiary sulfonium compounds or mixtures thereof. These catalytic phase transfer agents can be described by the formulas:

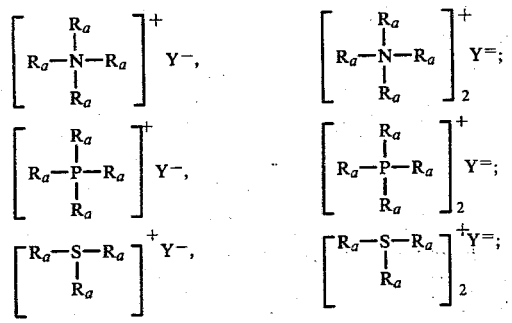

wherein each $R_a$ is independently selected from aliphatic hydrocarbon radicals having from about 1 to about 30 carbon atoms, preferably from about 2 to about 15 carbon atoms, each $Y^-$ is selected from the group consisting of $Cl^-$, $Br^-$, $F^-$, $CH_3SO_3^-$, $CH_3CO_2^-$, $CF_3CO_2^-$ or $OH^-$, and each $Y^{--}$ is selected from the group consisting of $SO_4^{--}$, $CO_3^{--}$, or $C_2O_4^{--}$. Any amount of catalytic phase transfer agent (PTA) can be employed, however generally effective molar proportions of PTA relative to the amount of water soluble base are within the range of from about 1:10 to about 1:1000 and more frequently within the range of from 1:100 to 1:1000.

The coupling reactions can be carried out at any temperature. Preferably temperatures within the range of from 0° to 150° C. or even higher, and more preferably from 50° C. to 100° are employed.

In order that those skilled in the art may better understand my invention, the following examples are given which illustrate the best mode of practicing my invention.

EXAMPLE I—PREPARATION OF QUINONE-COUPLED POLYPHENYLENE OXIDE

(A) Polymer Preparation, and (B) Catalyst Deactivation

A 2.5 gallon stainless steel reactor equipped with an air-driven paddle stirrer, oxygen inlet tube, and water-cooled coil and jacket was charged with 150 g. 2,6-xylenol, 2.3 liters of toluene, 1.5 g. of Adogen® 464, i.e. trialkyl ($C_{8-10}$) methyl ammonium chloride, 3.4 g. N,N'-di-t-butylethylenediamine (DBEDA), 47.5 g. di-methyl-n-butylamine (DMBA), and 15 g. di-n-butylamine (DBA), and 4.2 ml. of a catalyst stock solution formed by dissolving 19.30 g. of cuprous oxide in 500 ml. of a chilled 47.2% aqueous hydrobromic acid solution. Oxygen was bubbled through the reaction medium at a rate of 8.3 moles per hour and the mixture was stirred vigorously. 1350 g. of 2,6-xylenol in 1.5 liters of toluene was pumped into the reactor while the reaction temperature was maintained at 25°±1° C. over a 30-minute period. The temperature was then allowed to rise to 35°±1° C. After the desired reaction product viscosity was obtained the reactor was purged of oxygen by passing nitrogen instead of oxygen through the reaction medium and a 38% aqueous solution of a trisodium salt of ethylenediamine tetracetic acid (EDTA) was added to deactivate the catalyst system. Summarily, the reaction parameters relative to molar ratios of 2,6-xylenol:Cu:DBEDA:DMBA:Br:DBA were as follows: 1124:1:1:8:43:3.2:1.

| | Summary of Reaction Parameters and Properties of Poly(2,6-dimethyl-1,4-phenylene oxide) | | | | |
|---|---|---|---|---|---|
| Run No. | TMDQ (%) | React. Temp. (°C.) | React. Time (min.) | [η] dl./g.) | OH Absorbance @ 3610cm$^{-1}$ |
| 1 | 0.92 | 25-35 | 88.5 | 0.29 | 0.278 |

(C) Quinone Coupling

The reaction mixture as described in sections (A) and (B) above with a steady nitrogen sweep was heated to 50° C. and maintained at 50°-55° C. until the deep orange TMDQ color disappeared leaving a very light green solution. The resulting quinone-coupled polyphenylene oxide was precipitated by addition of 3 volumes of methanol, collected by filtration and dried at 90° C. in an air-circulating oven overnight.

| | Summary of Reaction Parameters and Properties of Quinone-Coupled Poly(2,6-dimethyl-1,4-phenylene oxide) | | | | |
|---|---|---|---|---|---|
| Run No. | TMDQ (%) | React. Temp. (°C.) | React. Time (min.) | [η] (dl./g.) | OH Absorbance @ 3610cm$^{-1}$ |
| 1 | <0.001 | 50-55 | 60 | 0.24 | 0.403 |

EXAMPLE II—PREPARATION OF BIS(4-TRIMETHYLSILOXYPHENYL)DISULFIDE

Hexamethyldisilazane (19.4 gms., 0.12 mole) was added to solid bis(4-hydroxyphenyl)disulphide (20 gms., 0.08 mole). The reaction began immediately giving a clear liquid. After 4 hours excess hexamethyldisilazane was removed by warming and evaporation. Gas chromatography showed no starting disulfide and only a trace of mono-hydroxy disulfide. The liquid product crystallized on cooling at 5° C. m.p. 21°-22°. The $^1H$ nmr was consistent with a disilylated disulfide of the formula:

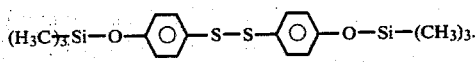

EXAMPLE III—PREPARATION OF POLY(TRIMETHYLSILOXY)TELECHELIC STYRENE POLYMER

Styrene (100 gms., 0.96 mole, freshly distilled), azobisisobutyronitrile (0.05 gms.) and bis(4-trimethylsiloxyphenyl) disulfide (5.83 gms., 0.15 mole) were heated under nitrogen in a 4 oz. screw-cap bottle for seven days at 50°±3° C. The clear viscous liquid was diluted with toluene and precipitated by adding to 500 ml. methanol containing a solution of 2 gms. calcium nitrate in 50 ml. ethanol in a stirred blender. The polymer was filtered off, dried, and reprecipitated as above, then dried, redissolved in toluene and precipitated by dropwise addition into 3 l. of methanol containing 1 ml. conc. hydrochloric acid. After filtering and drying, the polymer weighed 50.4 gms., exhibited an intrinsic viscosity (measured in chloroform at 25° C.) of 0.20 dl./g., and an infrared OH absorbance at 3590 cm.$^{-1}$ of 0.238 (500 mg./10 ml. CS$_2$). The polymer formula follows:

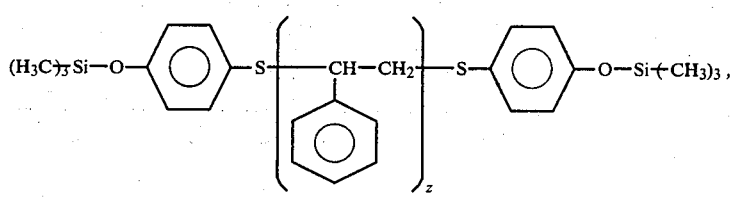

z being a number average of within the range of from about 150 to 250.

Summary of Reaction Parameters and Properties of Poly(trimethylsiloxy)telechelic Styrene Polymer

| Run No. | React. Temp. (°C.) | React. Time (days) | [η] (dl./g.) | OH Absorbance @ 3590cm$^{-1}$ |
|---|---|---|---|---|
| 1 | 50 | 7 | 0.23 | 0.24 |

EXAMPLE IV—ACYL-COUPLED BLOCK POLYMERS OF POLYPHENYLENE OXIDE AND POLYSTYRENE

A 300 ml. jacketed Waring blender equipped with a nitrogen inlet—in order to provide an inert nitrogen purged reaction medium, a thermocouple—located in the high fluid shear stress reaction region, and septum port was charged with 14 ml. monochlorobenzene, 2 g. of α,ω-(bis-4-trimethylsiloxyphenylthio)polystyrene prepared as in Example III and 2 g. of quinone-coupled polyphenylene oxide prepared as in Example I. Water at 45° C. was circulated through the blender jacket. A solution (0.2 ml.) containing 10% Aliquat ® 336, i.e. tricaprylmonomethylammonium chloride in toluene, was charged to the blender followed by 0.2 ml. of a 50% aqueous solution of NaOH. After high speed mixing for 2 minutes, isophthaloyl chloride was added as a solid over a 2-minute period. High shear reaction conditions were maintained throughout the addition of isophthaloyl chloride and for 2 minutes thereafter.

The resulting reaction mixture was diluted with toluene and slowly poured into a larger blender containing several volumes of methanol. The block polymer product was collected by filtration, washed and dried overnight in vacuo at 60° C.

Summary of Reaction Parameters and Properties of Acyl-Coupled Block Polymers

| Run No. | React. Temp. (°C.) | React. Time (min.) | [η] (dl./g.) | OH Absorbance @ 3610 | OH Absorbance @ 3590 |
|---|---|---|---|---|---|
| 1 | 45 | 4 | 0.51 | 0.01 | 0.01 |

A brief resume of the analysis of the resulting block polymer follows:

A sample of the block polymer (0.50 g.) was dissolved in 10 ml. of methylene chloride. The solution was stored at 2° C. for 2 days. A polymer:methylene chloride complex precipitate formed which was formed by filtration at 2° C. The precipitate was then heated to separate the methylene chloride from the polymer by evaporation. The polymer separated from the polymer:-methylene chloride complex, weighed 0.43 g. and contained based on IR analysis 58% by weight of polyphenylene oxide and 42% by weight of polystyrene. Analysis of the filtrate after evaporation of the methylene chloride established the presence of a residue containing 17% polyphenylene oxide and 83% polystyrene. On the basis of these results at least 72% of the initial polystyrene charged to the reaction medium was calculated as having been incorporated into an acyl-coupled polyphenylene oxide-polystyrene block polymer.

The conclusion that an acyl-coupled polyphenylene oxide-polystyrene block polymer was formed was based on the following evidence: the resulting polymer (1) initially dissolved in methylene chloride at 25° C., and (2) subsequently formed an insoluble methylene chloride:polymer complex which precipitated from solution, and (3) the precipitate was identified by IR data as containing both quinone-coupled polyphenylene oxide and polystyrene polymer segments. Of the polymer precursor segments, only the quinone-coupled polyphenylene oxide forms an insoluble methylene chloride complex. Accordingly, based on IR data identifying that a polymer containing both polyphenylene oxide and polystyrene segments were associated with the polymer:methylene chloride complex, it was concluded that an acyl-coupled polyphenylene oxide-polystyrene block copolymer had in fact been formed.

The formation of a methylene chloride complex with polyphenylene oxide is well-known to those skilled in the art as illustrated by A. Factor's U.S. Pat. No. 3,644,227, issued Feb. 22, 1972 and A. Factor et al.'s publication in Polymer Letters 7, 205 (1969).

The polyphenylene oxide polystyrene block polymers of this invention can be molded, calendered, or extruded as films, sheets, fibers, laminates or other useful articles of manufacture.

I claim:

1. An acyl-coupled block polymer comprising a polyvalent acyl radical, a divalent quinone-coupled polyphenoxy radical, and a divalent bis(oxyarylenethio)polystyrene radical.

2. An acyl-coupled block copolymer comprising an acyl radical of the formula

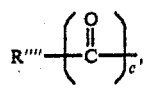

wherein c is a number at least equal to 2, and $R''''$ is $C_{1-8}$ alkylene, $C_{1-8}$ alkenylene, phenylene, halophenylene and $C_{1-8}$ alkyl substituted phenylene; a quinone-coupled polyphenoxy radical of the formula

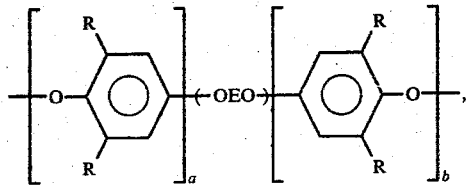

wherein independently each $-(OEO)-$ is a divalent quinone residue, E is a divalent arene radical, either a or b is at least equal to 1, the sum of a plus b is at least equal to 10, and R is hydrogen, a hydrocarbon radical, a halohydrocarbon radical, a hydrocarbonoxy radical or a halohydrocarbonoxy radical, and a polyfunctional polystyrene radical of the formula

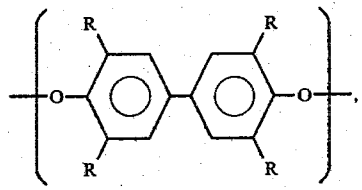

wherein independently each x is an integer at least equal to 1 and is a maximum equal to the number of replaceable hydrogen atoms associated with the $R''$ arene radical, y is an integer at least equal to 1, $R''$ is at least a divalent arene radical, Q is a hydrogen, halogen, alkyl or alkenyl radical, p is an integer of from b 1 to 5, and z is an integer at least equal to 2.

3. The claim 2 compound, wherein $R''''$ and $R''$ are phenylene, and $-(OEO)-$ is of the formula:

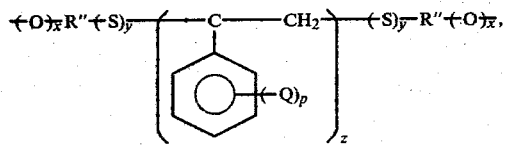

wherein independently each R is as defined hereinbefore.

4. The claim 3 compound, wherein c is equal to 2, the sum of a plus b is 40 to 170, both x and y are equal to 1, and z is 2 to 1000.

5. The claim 2, 3 or 4 compound, wherein each R is hydrogen, hydrocarbon or a halohydrocarbon radical.

6. The claim 5 compound, wherein each R is a methyl radical.

7. A process of forming an acyl-coupled polymer which comprises contacting a polyacylhalide, a quinone-coupled polyphenylene oxide having an average hydroxyl group per molecule value greater than zero including 2.0 or less, and a polyfunctional polystyrene selected from the class consisting of a bis(hydroxyarylenethio)polystyrene or a bis(organosiloxyarylenethio)polystyrene.

8. The claim 7 process, wherein the acyl halide is of the formula:

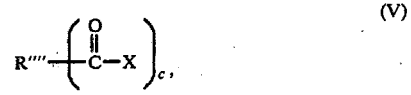

(V)

where c is a number at least equal to 2, X is fluorine, chlorine, bromine or iodine, and $R''$ is $C_{1-8}$ alkyl substituted phenylene, and the polyfunctional polyphenylene oxide is of the formula:

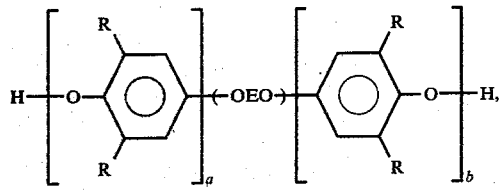

wherein independently each $-(OEO)-$ is a divalent quinone residue, E is a divalent arene radical, either a or b is at least equal to 1, the sum of a plus b is at least equal to 10, and R is hydrogen, a hydrocarbon radical, a halohydrocarbon radical, a hydrocarbonoxy radical or a halohydrocarbonoxy radical, and the polyfunctional polystyrene of the formula:

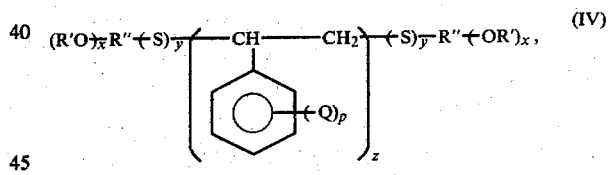

(IV)

wherein independently each x is an integer at least equal to 1 and is a maximum equal to the number of replaceable hydrogen atoms associated with the $R''$ arene radical, y is an integer at least equal to 1, $R'$ is hydrogen or an organosilyl group, $R''$ is at least a divalent arene radical having at least one $(R'O-)$ radical directly bonded to an aromatic ring carbon atom via the oxygen atom, Q is a hydrogen, halogen alkyl or alkenyl radical, p is an integer of from 1 to 5, and z is an integer at least equal to 2.

9. The claim 8 process, wherein $R''''$ is phenylene, X is a chloride, $-(OEO)-$ is of the formula:

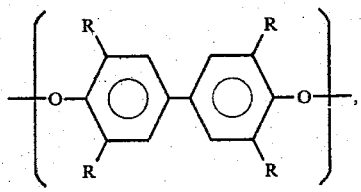

wherein independently each R is as defined hereinbefore, R' is hydrogen and R" is phenylene.

10. The claim 9 process, wherein c is equal to 2, the sum of a plus b is 40 to 170, both x and y are equal to 1, and z is equal to 2 to 1000.

11. The claim 10 process, wherein each R is hydrogen, a hydrocarbon, or a halohydrocarbon radical.

12. The claim 11 process, wherein each R is a methyl radical.

13. The claim 8, 9, 10, 11 or 12 process, carried out in the presence of water soluble base.

14. The claim 13 process, carried out in the presence of a catalytic phase transfer agent.

* * * * *